(12) United States Patent
Edwards et al.

(10) Patent No.: US 6,948,860 B1
(45) Date of Patent: Sep. 27, 2005

(54) OPTICAL SUBASSEMBLY FOR OPTOELECTRONIC DEVICES

(76) Inventors: Phillip J. Edwards, 6721 Positano La., San Jose, CA (US) 95138; Samuel Ho, 4977 Roselle Common, Fremont, CA (US) 94536; Bradley S. Levin, 164 Middlefield Rd., Palo Alto, CA (US) 94301; Robert William Musk, 2 Overlangs, Kingston, Kingsbridge Devon TQ7 4PF (GB)

(*) Notice: Subject to any disclaimer, the term of this patent is extended or adjusted under 35 U.S.C. 154(b) by 0 days.

(21) Appl. No.: 10/784,050

(22) Filed: Feb. 20, 2004

Related U.S. Application Data

(60) Provisional application No. 60/449,570, filed on Feb. 21, 2003.

(51) Int. Cl.[7] ............... G02B 6/36; G02B 6/12; G02B 6/42; G02B 6/30; G02B 6/10
(52) U.S. Cl. ............... 385/88; 385/14; 385/42; 385/49; 385/129; 385/130; 385/131
(58) Field of Search ............... 385/14, 42, 49, 385/52, 80, 129–131

(56) References Cited

U.S. PATENT DOCUMENTS

| | | | |
|---|---|---|---|
| 6,177,289 B1 * | 1/2001 | Crow et al. ............... 438/16 |
| 6,456,766 B1 * | 9/2002 | Shaw et al. ............... 385/47 |
| 2002/0009270 A1 * | 1/2002 | Laor ............... 385/95 |
| 2002/0045297 A1 * | 4/2002 | Leedy ............... 438/149 |
| 2002/0094185 A1 * | 7/2002 | Hopkin et al. ............... 385/137 |

* cited by examiner

Primary Examiner—Brian Healy
Assistant Examiner—Jerry Martin Blevins
(74) Attorney, Agent, or Firm—Parsons & Goltry; Robert A. Parsons; Michael W. Goltry

(57) ABSTRACT

An optoelectronic subassembly for optoelectronic modules includes a supporting substrate with an optoelectronic device mounted on a mounting surface. A supporting structure includes a trench for mounting the subassembly and a lens assembly. Four offset arms are provided each including a substrate-mounting portion, a supporting-structure-mounting portion, and a linking portion. The substrate-mounting portion and the supporting-structure-mounting portion have parallel surfaces with the linking portion extending at an angle therebetween. The arms include deformable material for allowing small changes in the angle. One of the parallel surfaces of each of the offset arms is mounted on either the mounting surface or an opposed surface of the supporting substrate and the other of the parallel surfaces is mounted on the support structure with the substrate suspended in the trench. The linking portion of the arms is then deformed to align the optoelectronic device with the lens assembly.

16 Claims, 2 Drawing Sheets

OPTICAL SUBASSEMBLY FOR OPTOELECTRONIC DEVICES

CROSS-REFERENCE TO RELATED APPLICATIONS

This application claims the benefit of U.S. Provisional Application No. 60/449,570, filed 21 Feb. 2003.

FIELD OF THE INVENTION

This invention relates to optoelectronic packaging and, more particularly, to the stable alignment of optical components.

BACKGROUND OF THE INVENTION

Optoelectronics is a rapidly expanding technology that plays an increasingly important role in many aspects of modern society (e.g., communication over optical fibers, computer storage and displays, etc.). With the increasing number of actual and potential commercial applications for optoelectronic systems, there is a need to develop cost effective and precise manufacturing techniques for assembling optoelectronic modules (e.g., fiber-optic cable repeaters, transmitters, etc.).

One of the problems associated with developing such cost effective manufacturing techniques is the high precision required to align components (e.g., lasers, photodiodes, optical fibers, etc.) to assure proper optical coupling and durability. Typically, an optoelectronic module includes a package or housing containing an optoelectronic device (e.g., semiconductor laser, light emitting diode, photodiode, etc.) coupled to an optical fiber (e.g., single mode, multi-mode or polarization maintaining) that extends from the package. A major challenge in assembling such optoelectronic modules is in maintaining optimal alignment of the optoelectronic device with the optical fiber to maximize the optical coupling. In order to obtain maximum optical coupling, it is typically desired that the core-center of the optical fiber be precisely aligned with that of the optoelectronic device. In some cases, such as with a single-mode optical fiber, the alignment between the optoelectronic device (i.e., laser) and optical fiber must be within tolerances of 1 $\mu$m or less.

A conventional method for aligning an optoelectronic laser with an optical fiber is known as "active alignment," where the laser is bonded to a substrate and one end of a desired type of optical fiber is positioned in close proximity to a light-emitting surface of the laser in order to transmit light emitted from the laser through the optical fiber. A photodetector, such as a large area photodetector, is positioned at the opposing end of the fiber to collect and detect the amount of light (optical radiation) coupled to and transmitted through the fiber. The position of the fiber is incrementally adjusted relative to the laser either manually or using a machine until the light transmitted through the fiber reaches a maximum, at which time, the optical fiber is permanently bonded to the same substrate that the laser was previously bonded to.

An optoelectronic photodiode, such as a PIN or APD photodiode, may similarly be coupled to an optical fiber through "active alignment" by bonding the photodiode to a substrate and positioning the end of the optical fiber that is to be coupled to the photodiode in proximity to the light receiving surface of the photodiode. Light is then radiated through the opposing end of the optical fiber using a light source and the position of the fiber is incrementally adjusted relative the photodiode until the photodiode's electrical response reaches a maximum, wherein the optical fiber is then bonded to the substrate supporting the photodiode.

Alternatively, such "active alignment" of an optoelectronic device (e.g., laser or photodiode) to an optical fiber has been attempted by initially bonding the optical fiber to the substrate, moving the optoelectronic device into alignment by detecting the maximum optical radiation through the fiber, and then bonding the aligned optoelectronic device to the substrate supporting the fiber. It is highly desirable, however, to be able to accurately align an optical device with an optical fiber using a method that is quick and inexpensive.

It would be highly advantageous, therefore, to remedy the foregoing and other deficiencies inherent in the prior art.

It is an object of the present invention to provide a new and improved subassembly for optoelectronic modules.

Another object of the present invention is to provide a new and improved subassembly for optoelectronic modules that can be easily incorporated into any of the present optoelectric modules.

Another object of the present invention is to provide a new and improved subassembly for optoelectronic modules that provides greater flexibility in optical alignment of optoelectronic components.

SUMMARY OF THE INVENTION

Briefly, to achieve the desired objects of the instant invention in accordance with a preferred embodiment thereof, an optoelectronic subassembly for optoelectronic modules is provided that includes a supporting substrate having a mounting surface and an opposed surface with an optoelectronic device mounted on the mounting surface. At least three offset arms are provided each including a substrate-mounting portion, a supporting-structure-mounting portion, and a linking portion. The substrate-mounting portion and the supporting-structure-mounting portion include substantially parallel surfaces with the linking portion extending at an angle therebetween and at least the linking portion includes deformable material for allowing small changes in the angle. One of the parallel surfaces of each of the at least three offset arms is mounted on one of the mounting surface of the supporting substrate and the opposed surface.

In a specific embodiment, a supporting structure with a trench formed therein is provided with an optical lens assembly positioned thereon. The optical lens assembly can be, for example, an optical fiber, a lens, combinations thereof, or similar devices or structures which are desired to interact with light received from or supplied to the optoelectronic device. One of the parallel surfaces of each of the at least three offset arms is mounted on one of the mounting surface of the supporting substrate and the opposed surface and the other of the parallel surfaces of each of the at least three offset arms is mounted on the mounting surface of the support structure with the supporting substrate suspended in the trench. The linking portions of the at least three offset arms are then deformed to move the optoelectronic device into optical alignment with the optical lens assembly.

The desired objects of the instant invention are further realized in another method of mounting and aligning an optoelectronic subassembly for optoelectronic modules on a supporting structure. This method includes the step of providing a supporting substrate having a mounting surface and an opposed surface and an optoelectronic device mounted on the mounting surface. A supporting structure having a mounting surface and an optical lens assembly mounted on the mounting surface is also provided. The method further includes placing a layer of adhesive in a semi-liquid state on the mounting surface proximate the optical lens assembly, placing the opposite surface of the supporting substrate on the layer of adhesive, and applying a force to the supporting substrate to optically align the optoelectronic device with the optical lens assembly. Once alignment is achieved the adhesive is allowed to cure with the optoelectronic device and the optical lens assembly optically aligned.

BRIEF DESCRIPTION OF THE DRAWINGS

The foregoing and further and more specific objects and advantages of the instant invention will become readily apparent to those skilled in the art from the following detailed description of a preferred embodiment thereof taken in conjunction with the drawings, in which.

DETAILED DESCRIPTION OF THE DRAWINGS

Figure 1:
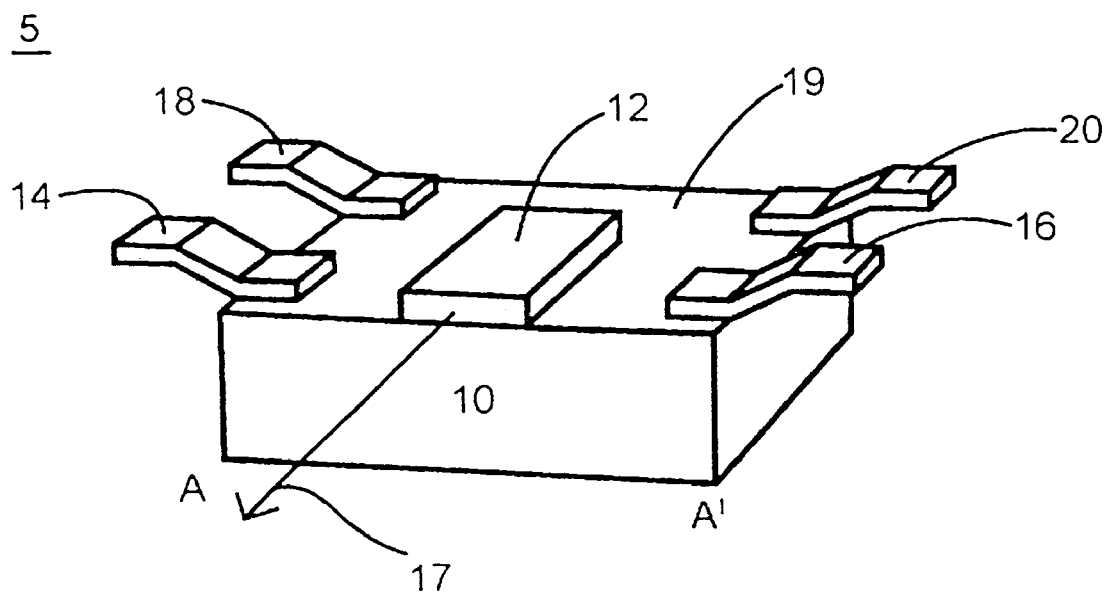
FIG. 1 is a perspective view of an optoelectronic subassembly in accordance with the present invention.

Turning now to FIG. 1, an optoelectronic subassembly 5 in accordance with the present invention is illustrated. Optoelectronic subassembly 5 includes a device mount or supporting substrate 10, having an upper or mounting surface 19 onto which an optical device 12 is mounted. At the present time, substrate 10 and optical device 12 are usually purchased as a component from a manufacturer. In this embodiment, substrate 10 includes a ceramic material layer. However, it will be understood that substrate 10 can include other suitable materials, such as a semiconductor, an insulator, a conductor, or the like. Further, substrate 10 is illustrated as including a single ceramic material layer for simplicity. It will be understood, however, that substrate 10 can include more than one layer. Further, it will be understood that mount or substrate 10 can include other electronic or optoelectronic devices or circuitry.

In this embodiment, for purposes of explanation, optical device 12 includes a semiconductor laser which emits light, represented by arrow 17. However, optical device 12 can include other light emitting or receiving optoelectronic devices, such as a light emitting diode, a photodiode, or the like. It will of course be understood that arrow 17 will be directed in the opposite direction when device 12 is a light sensing device. Also, laser 12 is illustrated as being positioned on substrate 10 for illustrative purposes only and laser 12 or substrate 10 can include a heatsink or similar heat conducting structure.

In the preferred embodiment, optoelectronic subassembly 5 includes offset arms 14, 16, 18, and 20 which are fixedly attached to substrate 10. Offset arms 14, 16, 18, and 20 are fixedly attached to substrate 10 using an adhesive, a solder, or a similar material which provides suitable properties for adhesion over a desired temperature range. Further, it will be understood that offset arms 14, 16, 18, and 20 can include a conductive material, such as a metal or a similar material, which provides mechanical strength to support substrate 10 and optical device 12. In this preferred embodiment, at least some of offset arms 14, 16, 18, and 20 are electrically coupled (e.g. by direct connection, wire bonding, etc,) to optical device 12 and any other electronics (e.g. monitoring diodes, amplifiers, etc.) mounted on substrate 10. Also in this embodiment, offset arms 14, 16, 18, and 20 are fabricated from a material which can be relatively easily bent or formed into a desired shape, as will be discussed presently, and which will hold the desired shape against normal forces (e.g. dropping, jarring, etc.) once it is achieved.

In this embodiment, four offset arms (i.e. arms 14, 16, 18, and 20) are illustrated for simplicity and ease of discussion. However, it will be understood that any number of arms greater than two can be used to mount substrate 10 and optical device 12 and the use of four arms in this embodiment is not intended to limit the scope of the invention.

Figure 2:
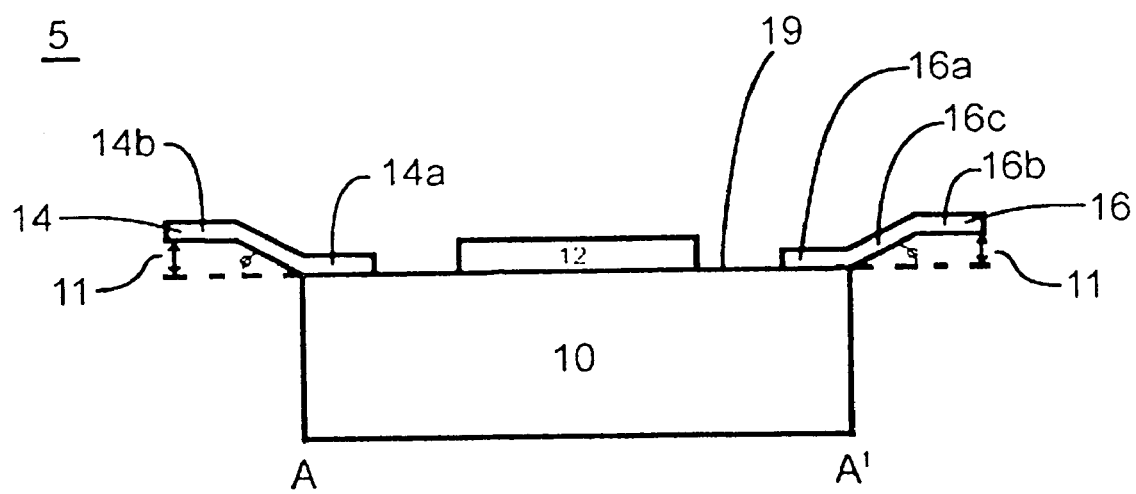
FIG. 2 is a front view of the optoelectronic subassembly illustrated in FIG. 1.

Referring additionally to FIG. 2, a front view perpendicular to a line A–A' of optoelectronic subassembly 5 is illustrated. As can be seen clearly in FIGS. 1 and 2, in this embodiment, offset arms 14, 16, 18, and 20 are each formed with a similar or standard offset. That is (using arm 14 as an example), arm 14 includes a substrate-mounting portion 14a and a substantially parallel but offset supporting-structure-mounting portion 14b. A linking portion 14c is formed to angle between offset portions 14a and 14b and is at least partially deformable, i.e. the angle of linking portion 14c can be changed to change the offset between portions 14a and 14b.

Referring specifically to FIG. 2, it is shown that arms 14 and 16 (and arms 18 and 20) are formed so that angled portions 14c and 16c are at an angle θ, relative to mounting surface 19 of substrate 10 (and to portions 14a and 14b and to portions 16a and 16c, respectively). Further, a lower surface of portions 14b and 16b of arms 14 and 16, respectively, are a vertical distance 11 from surface 19. However, because at least the linking portion of the offset arms is deformable, distance 11 and, consequently, angle θ, can be adjusted by deforming or bending arms 14 and 16. The distance 11 and the angle θ between the lower surface of portions 14b and 16b of arms 14 and 16, respectively, (and arms 18 and 20) and surface 19 are assumed to be substantially equal (i.e. within a manufacturing tolerance for arms 14, 16, 18, and 20) for illustrative purposes only and ease of discussion.

Figure 3:
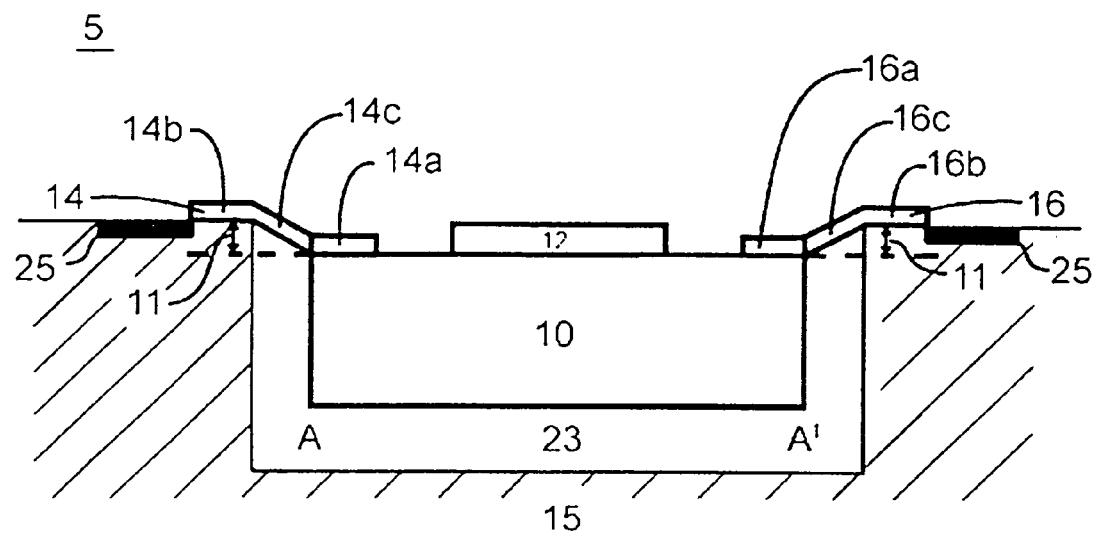
FIG. 3 is a front view of the optoelectronic subassembly illustrated in FIGS. 1 and 2 positioned on a supporting structure.

Turn now to FIG. 3 which illustrates a front view perpendicular to line A–A' of optoelectronic subassembly 5 wherein subassembly 5 is positioned or suspended within a trench 23 in a supporting structure 15. Subassembly 5 is positioned such that the lower surface of portions 14b and 16b of arms 14 and 16 (and similarly for arms 18 and 20) engage an upper or mounting surface of support structure 15. Arms 14, 16, 18, and 20 can be fixedly attached to support structure 15 using an adhesive, a solder, or a similar material with a desired property of adhesion. Also, in a preferred embodiment, the lower surface of some or all of offset arms 14, 16, 18, and 20 are electrically connected to I/O pads 25 on the surface of supporting structure 15.

In this explanation, arms 14, 16, 18, and 20 are illustrated as being mounted so that the linking portions angle upwardly at an angle θ, however it will be understood that the arms could be reversed so that the linking portions angle downwardly from surface 19 at the angle θ in applications where this arrangement would bring device 12 into closer optical alignment with other devices (not shown) mounted on support structure 15. Also, in other applications (e.g. where optical lenses, fibers, etc. are mounted in or in alignment with trench 23) substrate 10 and device 12 could be reversed or rotated 180 degrees and arms 14, 16, 18, and 20 could be attached to the surface opposite surface 19 in either of the above described orientations.

The deforming or bending of arms 14 and 16 allows optical device 12 to be adjusted (generally vertically) relative to an optical lens assembly (not shown) wherein it is desired to optically couple light 17 into (or out of) the optical lens assembly. It will be understood that the optical lens assembly can be, for example, an optical fiber, a lens, combinations thereof, or similar devices or structures which are desired to interact with light 17. It will be understood that adjustment of device 12 (especially in a vertical direction) can generally be accomplished with the application of sufficient pressure (upwardly or downwardly) on substrate 10 to deform the angled portions of the arms.

Figure 4:
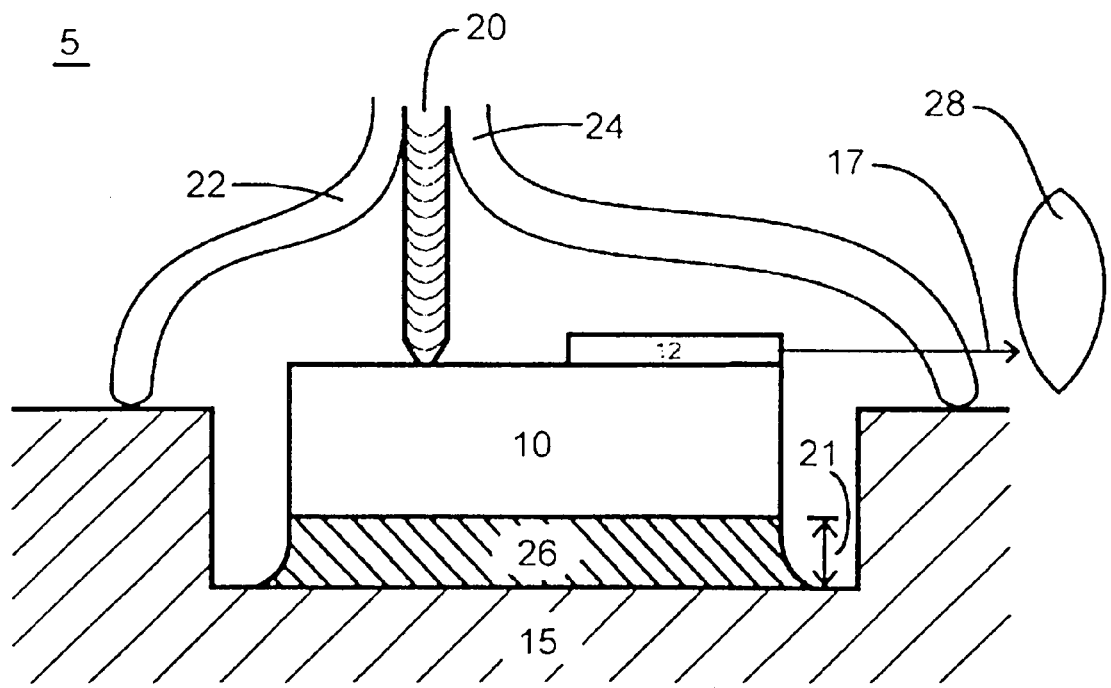
FIG. 4 is a plan view of another embodiment of an optical subassembly in accordance with the present invention.

Turning now to FIG. 4, another embodiment of an optoelectronic subassembly 7', in accordance with the present invention, is illustrated. Components of this embodiment that are similar to components of the embodiment of FIG. 3, are designated with similar numbers and a prime is added to indicate the different embodiment. Subassembly 7' includes substrate 10' with optical device 12' positioned thereon. Substrate 10' is fixedly attached to support structure 15' (generally within a trench or adjacent a step or the like) using an adhesive 26' with a thickness 21'. It will be understood that adhesive 26' can include an epoxy, a eutectic, a glue layer or a similar material with a desired property for adhesion and an initial liquid or semi-liquid state (sufficiently solid or adhesive to maintain thickness 21' with no outside force other than gravity).

In this embodiment, subassembly 7' is initially fabricated using a D/A tip 20' with arms 22' and 24'. It will be understood that arms 22' and 24' are designed to frictionally engage an upper surface of support structure 15' and control a pressure applied to substrate 10' from D/A tip 20'. D/A tip 20' and arms 22' and 24' can be from an attach tool wherein D/A tip 20' could be, for example, threadedly engaged within arms 22' and 24', and is used to adjust the pressure applied by tip 20' to substrate 10' when adhesive 26' is in a liquid or semi-liquid state. Through the threaded feature (if included) of D/A tip 20', substrate 10' can be moved vertically very minute amounts until a desired optical alignment is achieved, after which adhesive 26' is allowed to set. The pressure applied to substrate 10' will change thickness 21' so that optical device 12' is aligned (generally vertically) with an optical lens assembly 28'. It will be understood that optical lens assembly 28' can be, for example, an optical fiber, a lens, or a similar device or structure which is desired to interact with light 17'.

Thus, a new and improved subassembly for optoelectronic modules has been disclosed. The new and improved subassembly can be easily incorporated into any of the present optoelectric modules and greatly improves flexibility in optical alignment of optoelectronic components. Further, any of the embodiments disclosed are relatively simple and inexpensive to incorporate into any of the present day structures or into new structures.

Various changes and modifications to the embodiments herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

1. An optoelectronic subassembly for optoelectronic modules comprising:
   a supporting substrate having a mounting surface and an opposed surface;
   an optoelectronic device mounted on the mounting surface; and
   at least three offset arms each including a substrate-mounting portion, a supporting-structure-mounting portion and a linking portion, the substrate-mounting portion and the supporting-structure-mounting portion including substantially parallel surfaces with the linking portion extending at an angle therebetween, and at least the linking portion including deformable material for allowing small changes in the angle, one of the parallel surfaces of each of the at least three offset arms being mounted on one of the mounting surface of the supporting substrate and the opposed surface.

2. An optoelectronic subassembly for optoelectronic modules as claimed in claim 1 wherein the at least three offset arms include electrically conductive material.

3. An optoelectronic subassembly for optoelectronic modules as claimed in claim 2 wherein the optoelectronic device includes electrical connections and some of the at least three offset arms are coupled, one each, to the electrical connections.

4. An optoelectronic subassembly for optoelectronic modules as claimed in claim 3 further including a supporting structure including a mounting surface and another of the parallel surfaces of each of the at least three offset arms being mounted on the mounting surface of the supporting structure.

5. An optoelectronic subassembly for optoelectronic modules as claimed in claim 4 wherein at least some of the parallel surfaces of each of the at least three offset arms mounted on the mounting surface of the supporting structure are coupled to I/O pads on the mounting surface of supporting structure.

6. An optoelectronic subassembly for optoelectronic modules as claimed in claim 4 wherein the supporting structure includes a trench and the at least three offset arms mount the supporting substrate suspended in the trench.

7. An optoelectronic subassembly for optoelectronic modules comprising:
   a supporting substrate having a mounting surface and an opposed surface;
   an optoelectronic device mounted on the mounting surface;
   a supporting structure including a mounting surface; and
   at least three offset arms each including a substrate-mounting portion, a supporting-structure-mounting portion and a linking portion, the substrate-mounting portion and the supporting-structure-mounting portion including substantially parallel surfaces with the linking portion extending at an angle therebetween, and at least the linking portion including deformable material for allowing small changes in the angle, one of the parallel surfaces of each of the at least three offset arms being mounted on one of the mounting surface of the supporting substrate and the opposed surface and the other of the parallel surfaces of each of the at least three offset arms being mounted on the mounting surface of the support structure.

8. An optoelectronic subassembly for optoelectronic modules as claimed in claim 7 wherein the at least three offset arms include electrically conductive material.

9. An optoelectronic subassembly for optoelectronic modules as claimed in claim 8 wherein the optoelectronic device includes electrical connections and some of the at least three offset arms are coupled, one each, to the electrical connections.

10. An optoelectronic subassembly for optoelectronic modules as claimed in claim 9 wherein at least some of the parallel surfaces of each of the at least three offset arms mounted on the mounting surface of the supporting structure are coupled to I/O pads on the mounting surface of supporting structure.

11. A method of mounting and aligning an optoelectronic subassembly for optoelectronic modules on a supporting structure comprising the steps of:

provioding a supporting substrate having a mounting surface and an opposed surface, an optoelectronic device mounted on the mounting surface, and at least three offset arms each including a substrate-mounting portion, a supporting-structure-mounting portion and a linking portion, the substrate-mounting portion and the supporting-structure-mounting portion including substantially parallel surfaces with the linking portion extending at an angle therebetween, and at least the linking portion including deformable material for allowing small changes in the angle, one of the parallel surfaces of each of the at least three offset arms being mounted on one of the mounting surface of the supporting substrate and the opposed surface;

providing a supporting structure having a mounting surface and an optical lens assembly;

mounting the other of the parallel surfaces of each of the at least three offset arms on the mounting surface of the support structure with the optoelectronic device roughly in optical alignment with the optical lens assembly and the supporting substrate spaced from the supporting structure; and deforming the linking portion of the at least three offset arms to move the optoelectronic device into optical alignment with the optical lens assembly.

12. A method as set forth in claim 11 including a step of forming a trench in the supporting structure and suspending the supporting substrate in the trench with the at least three offset arms.

13. A method as claimed in claim 11 wherein the optoelectronic device includes electrical connections and the supporting structure includes I/O pads on the mounting surface, the step of mounting includes electrically connecting the electrical connections to the I/O pads through the at least three offset arms.

14. A method of mounting and aligning an optoelectronic subassembly for optoelectronic modules on a supporting structure comprising the steps of:

providing a supporting substrate having a mounting surface and an opposed surface, an optoelectronic device mounted on the mounting surface;

providing a supporting structure having a mounting surface and an optical lens assembly mounted on the mounting surface;

placing a layer of adhesive in a semi-liquid state on the mounting surface proximate the optical lens assembly;

placing the opposite surface of the supporting substrate on the layer of adhesive;

applying a force to the supporting substrate to optically align the optoelectronic device with the optical lens assembly; and allowing the adhesive to cure with the optoelectronic device and the optical lens assembly optically aligned.

15. A method as claimed in claim 14 wherein the step of placing the layer of adhesive includes placing a layer of adhesive sufficiently thick to place the optoelectronic device vertically above alignment with the optical lens assembly and the step of applying a force includes pushing the supporting substrate vertically downward until the optoelectronic device and the optical lens assembly are optically aligned.

16. A method as claimed in claim 14 wherein the step of applying a force includes using a D/A tip with arms.

* * * * *